United States Patent Office 2,944,312
Patented July 12, 1960

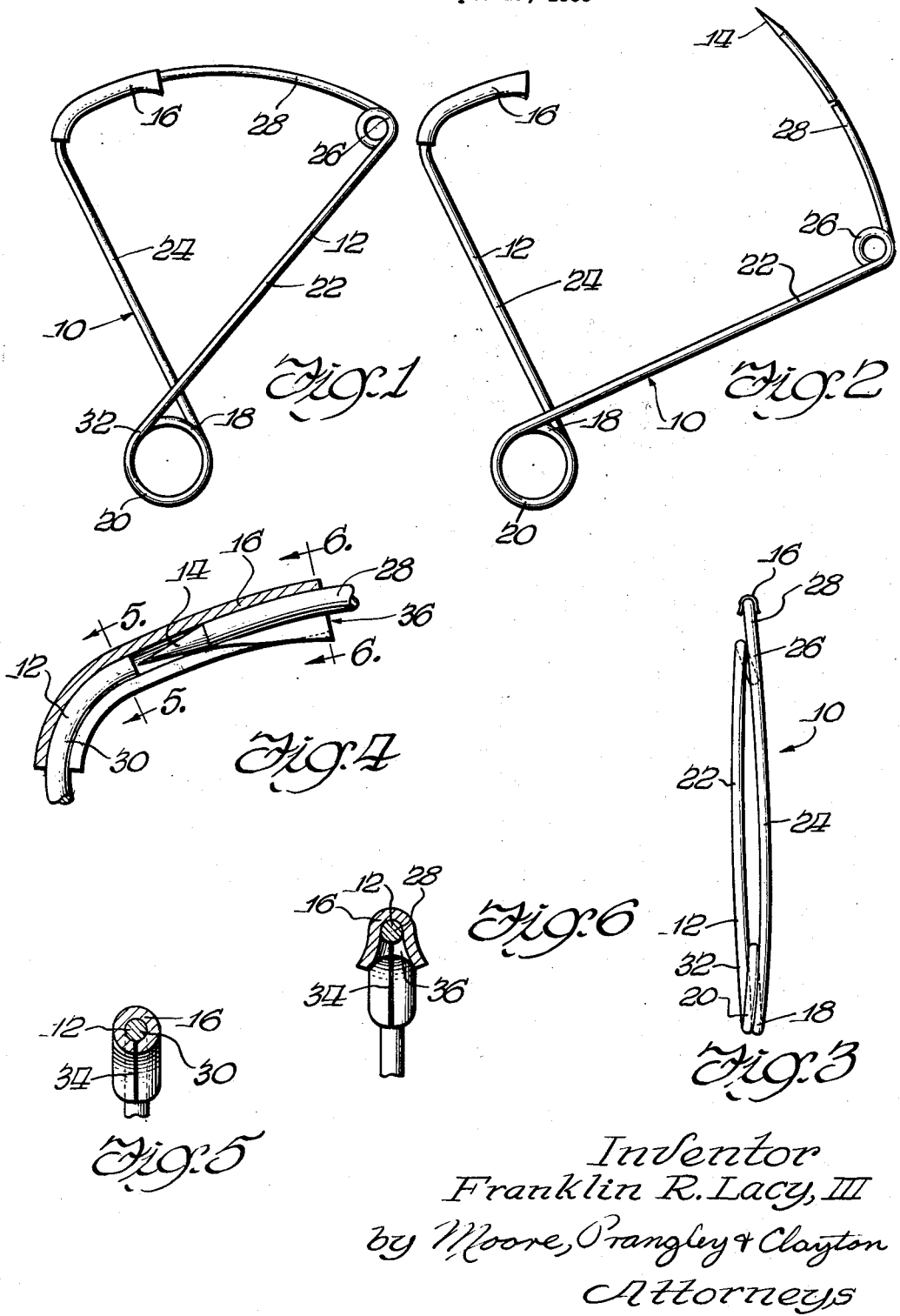

2,944,312

PIN FASTENER

Franklin R. Lacy III, 926 Raleigh Road, Glenview, Ill.

Filed Sept. 19, 1955, Ser. No. 535,147

6 Claims. (Cl. 24—161)

This invention relates to a pin fastener. More particularly it relates to a self-closing pin fastener of the safety type.

It is an object of this invention to provide a new and improved self-closing pin fastener.

A further object is to provide a new and improved self-closing pin fastener which is readily moved with one hand to open position for engagement with the object or objects to be fastened.

Still another object is to provide a new and improved self-closing pin fastener having a simple and economical structure.

Other objects will appear hereinafter.

These and other objects and advantages of the invention will be better understood from the following description when taken in conjunction with the drawings which form a part of this specification. In the drawings wherein like reference numerals have been used to designate like parts throughout:

Figure 1 is a view in elevation of a pin fastener embodying the features of the present invention;

Figure 2 is a view similar to Figure 1 showing the pin in open position;

Figure 3 is a side elevational view of the same pin;

Figure 4 is an enlarged detailed view partly in central vertical cross section through the guard of the pin;

Figure 5 is a view in cross section on the line 5—5 in Figure 4; and

Figure 6 is a view partly in cross section on the line 6—6 in Figure 4.

As may be seen in the drawings, the pin fastener designated generally 10 comprises a length of resilient wire 12 sharpened or pointed at one end as at 14 to enable the pin to be readily engaged with an object or objects to be fastened. The other end of the length of wire 12 has secured thereon by crimping, clinching or any other desired means a guard 16 of generally tubular configuration.

The wire 12 centrally of its length is bent into the form of a relatively large circle as at 18 and a further length of the wire approximating three quarters of the circumference of this circle is similarly curved as at 20 into a continuation of the wire forming the circle. As may be seen in Figure 3, the portion 20 lies alongside of and against the part of the wire forming the circle 18. A relatively long section 22, which is straight as viewed in Figures 1 and 2, extends out from the portion 20 to provide one arm of the fastener 10. From the end of the circular portion 18 opposite to that adjoining section 20 a relatively long section 24, which is straight as viewed in Figures 1 and 2, extends outwardly to form the second arm of the fastener 10. As may be seen, in this way the arms 22 and 24 extend at an angle of about 65° with respect to each other.

The outer end of the arm 22 adjoins a section 26 which is formed into an arc of approximately 450° on a comparatively small radius and which is in turn adjoined by a relatively long section 28 which terminates in the point 14 previously described. Referring now to the arm 24, it is pointed out that the wire from the outer end of this arm is curved through an arc of approximately 90° on a radius corresponding roughly to that of the circle 18 to provide a section 30 upon which the guard 16 is mounted.

It may be seen particularly in Figure 1 that the wire section 28 and the portion of the guard 16 extending beyond the wire section 30 are both arcuate in form as viewed in that figure. The location and curvature of this portion of guard 16 and of section 28 is such that the point 14 is readily inserted in the guard 16 to occupy the position indicated in Figure 4. The arm 22 as viewed in Figure 3 necessarily extends laterally adjacent its lower end 32 in order to clear the portion of the wire forming the ring 18. As indicated in Figure 3, to this end both the arm 22 and the arm 24 are formed with a slight curvature as viewed in that figure so that the point 14 may be positioned in alignment with the hollow interior of the guard 16.

The ring 18 formed in the wire 12 adjacent its midportion serves to provide greater resiliency for pivoting of the arm 22 with respect to the arm 24 and, as will appear, also provides a portion which is more readily gripped to move the fastener to the open position shown in Figure 2. The arc 26, in addition to serving a similar function of making the pivoting of the section 28 with respect to the arm 22 easier of accomplishment, also serves to align section 28 with the guard 16 because of the lateral extension of this arc 26 which is best seen in Figure 3.

Referring now more particularly to the guard or tubular head 16 it is seen particularly from Figure 4 that this guard as shown is formed of a piece of sheet metal clamped around the wire section 30 so that its opposite edges are adjacent as at 34. The forward portion of this sheet increases in width progressively as indicated in Figure 4 and this portion instead of being bent around in a full circle so that the opposite edges meet is bent into the shape indicated in Figure 6. In this way an enlarged opening 36 is provided at the outer end of the guard through which the point 14 may enter the interior of the guard 16 from the side of the guard which faces toward the ring 18.

The inner surface of this opening 36 serves to engage the point 14, even though it is slightly out of alignment, and guide it into the position shown in Figure 4 which is the position it normally occupies. As previously indicated, Figure 1 illustrates the normal position of the various parts of the fastener 10 with the point 14 pressed firmly into the guard 16, the bend in the wire 12 between the arms 22 and 24 being so made as to bias the wire in such a way that the arms 22 and 24 are urged toward each other. In order to engage the fastener with an object or objects to be fastened the fastener is moved to the position shown in Figure 2, conveniently, for example, by placing the thumb against the outer portion of the ring 18 and one or more fingers in the angle between the arms 22 and 24. The fingers and thumbs are then pressed toward each other. The arms 22 and 24 are forced apart so that the point 14 is exposed and may be inserted in the object to be fastened.

In this connection it should be noted that the bend or ring 26 is so formed that the arm when it is free of the guard 16 extends as shown in Figure 2 at an angle to the arm 22 which is substantially greater than the angle between these arms when the point 14 is positioned within the guard 16 as shown in Figures 1 and 4. Thus when the pin 10 is moved from closed position as shown in Figure 1 to the open position shown in Figure 2 the arm 28 springs outwardly away from the arm 22 so that the point 14 is readily engaged with an article to be fastened. After it is so engaged pressure is applied to the arm 28 to force it toward arm 22 and when the arm 28 has been forced in a sufficient distance so that it forms an angle with the arm 22 which is slightly less than that shown in Figure 1 the pressure holding arms 22 and 24 apart is released whereupon these arms move toward each other. When this movement has progressed to the point where the point 14 is alongside the inner face of guard 16 and opposite the side of opening 36 release of the pressure on arm 28 permits it to move away from arm 22 thereby moving the point 14 into the opening 36. When pressure forcing arms 22 and 24 apart is then completely released point 14 moves further into guard 16 to the position shown in Figure 4.

The uses and advantages of the invention will be readily apparent from the foregoing description. A simple and economical structure has been provided. The pin fastener has the advantage of the safety provided by the guard 16 coupled with the feature of being biased toward closed position, making it possible to press the fastener into an open position with one hand and engage the object or objects to be fastened and then after pressing arm 28 inwardly gradually release the pressure holding the fastener 10 open until the point is alongside the guard whereupon release of all pressure permits the fastener to move to the closed fastening position shown in Figure 1.

It is apparent that many widely different embodiments of this invention may be made without departing from the spirit and scope thereof and, therefore, it is not intended to be limited except as indicated in the appended claims.

1. A pin fastener comprising a pair of arms and means resiliently joining said arms adjacent one end of each arm, the opposite end of one arm carrying thereon means terminating in a piercing point and the opposite end of the other arm carrying thereon means forming a generally tubular guard member normally housing said piercing point, said means resiliently joining said arms being biased to urge said piercing point toward said guard member and permitting said point to be withdrawn therefrom and passed through parts to be fastened and means resiliently urging the means carrying said piercing point outwardly away from said guard member, said guard member having an opening of relatively large cross-sectional area extending over one end and along the side of the guard facing toward the joint between said arms.

2. A pin fastener comprising a pair of arms resiliently joined adjacent one end of each arm, the opposite end of one arm terminating in a piercing point and said one arm including a resilient joint intermediate its length between the portion thereof joined to the other arm and the portion thereof carrying the piercing point, said latter portion extending from said last named joint in the general direction of the opposite end of the other of said arms and substantially in the same plane as the other arm and the said portion joined thereto, said opposite end of the other arm carrying thereon means forming a tubular guard member extending generally in the direction of said last named joint, normally housing said piercing point and having an opening therein of relatively large cross-sectional area on the end of the tubular portion facing said last named joint and extending around on the side of said tubular member facing said first named joint, said first named resilient joint being biased to urge said piercing point into the said guard member, and said second named resilient joint being biased to urge the portion of the arm carrying the piercing point outwardly so that it forms a greater angle with the other portion of said arm when the point is free of restraint than the angle between said portions when the piercing point is housed within the guard member.

3. A pin fastener as described in claim 2 in which the fastener consists of a single length of resilient wire and a guard member, one end of said wire being formed to provide said piercing point and the other carrying said guard member.

4. A pin fastener as described in claim 3 in which the resilient joints are formed and biased by loops of the wire extending substantially in the said plane in which the said point carrying arm portion extends.

5. A pin fastener formed of a single length of resilient wire and a guard member in which the wire is formed to provide a pair of arms resiliently joined adjacent one end of each arm, the opposite end of one arm terminating in a piercing point and the opposite end of the other arm carrying thereon said guard member which normally houses said piercing point, the said resilient joint between said arms consisting of a generally circular loop of the wire extending through approximately 650° of arc and biased to urge said piercing point toward said guard member but permitting said point to be withdrawn therefrom and passed through parts to be fastened and the said arm terminating in a point consisting of two portions connected by a generally circular loop of wire extending through an arc of approximately 450° and also extending generally longitudinally of said two portions, the angle between the two portions when the point is free of restraint being greater than the angle between said two portions when said piercing point is housed within said guard member.

6. A pin fastener as described in claim 5 in which the guard member is generally tubular in form and has an opening therein of relatively large cross-sectional area extending over one end and along the side of the guard facing toward the joint between said arms.

References Cited in the file of this patent

UNITED STATES PATENTS

| 144,303 | Adams | Nov. 4, 1873 |
| 635,249 | Hay | Oct. 17, 1899 |
| 805,160 | Sargent | Nov. 21, 1905 |
| 1,246,582 | Froehly | Nov. 13, 1917 |
| 2,692,415 | Forde | Oct. 26, 1954 |

FOREIGN PATENTS

| 155,584 | Germany | of 1904 |